INVENTOR.
William MacDonald Urquhart.
BY
Harness, Dickey & Pierce
ATTORNEYS.

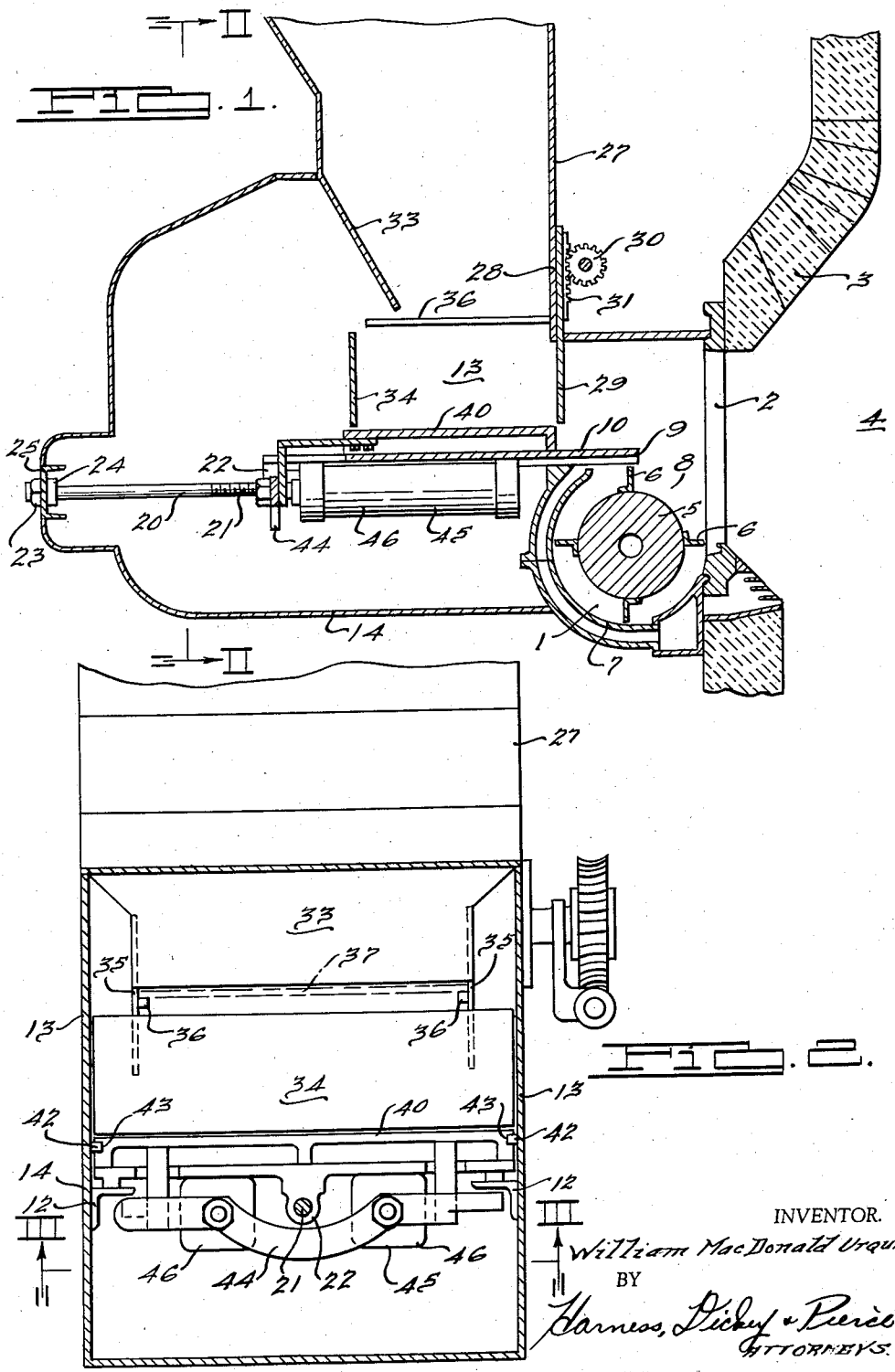

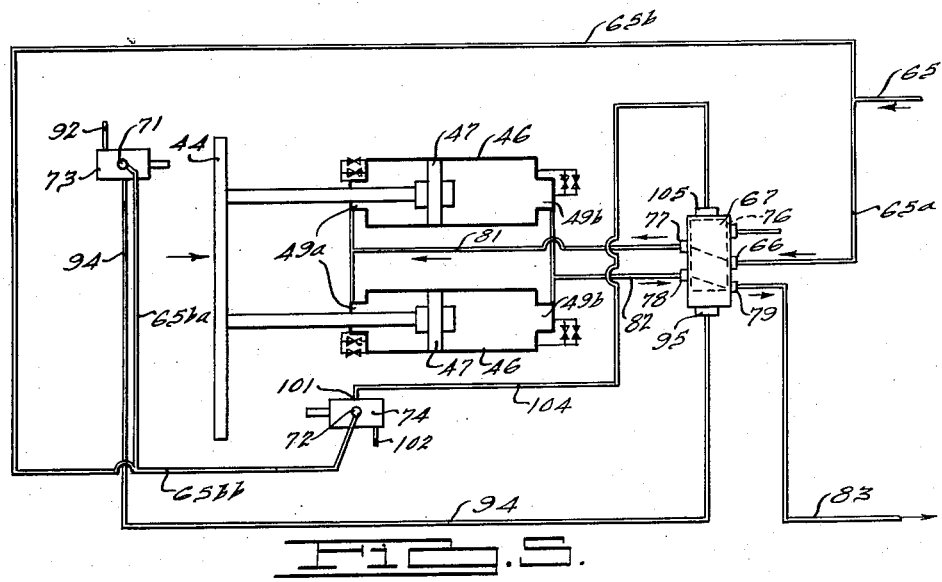
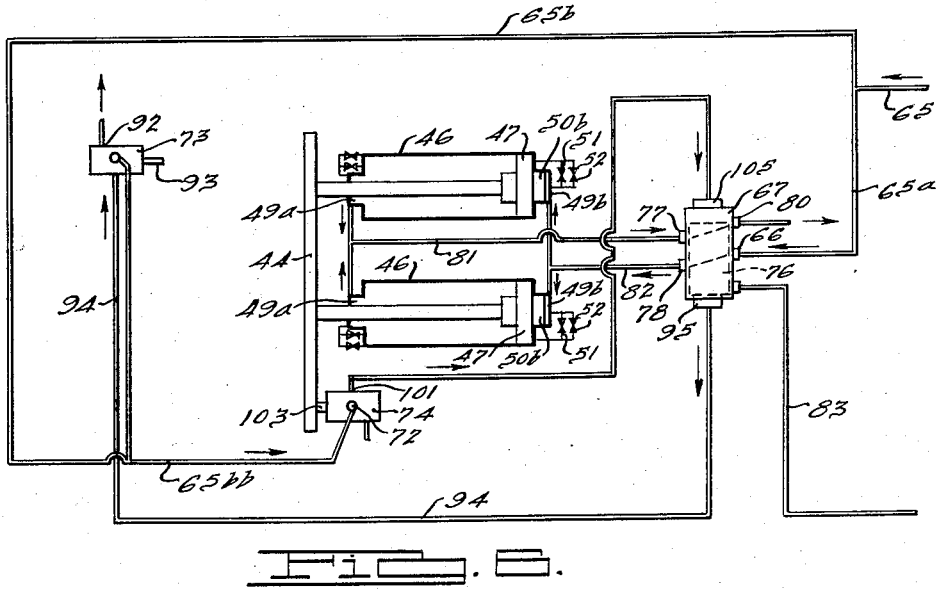

Feb. 17, 1959  W. MacDONALD URQUHART  2,873,846
FUEL FEEDER

Filed Jan. 7, 1957  4 Sheets-Sheet 4

INVENTOR.
William MacDonald Urquhart
BY
Harness, Dickey & Pierce
ATTORNEYS.

United States Patent Office 2,873,846
Patented Feb. 17, 1959

2,873,846
FUEL FEEDER

William MacDonald Urquhart, Renfrew, Scotland, assignor to Detroit Stoker Company, Detroit, Mich., a corporation of Michigan Application January 7, 1957, Serial No. 632,780

10 Claims. (Cl. 198—226)

This invention relates to feeders for solid material in a state of division of the kind having a reciprocating feeding device arranged by moving in relation to a co-operating member to effect movement relatively to that member of material supported on the member and whilst more widely applicable is of particular importance in connection with the supply of fuel to combustion apparatus such as furnaces fired by spreader stokers having mechanical or pneumatic spreading means, cyclone furnaces or pulverized fuel fired furnaces operating with unit mills.

Considering the case of a spreader stoker fired furnace, when a reciprocating feeding device is used to supply fuel to the furnace, the flow of fuel is of necessity discontinuous. The flow of combustion air, on the other hand, is continuous and as a result the ratio of fuel to air entering the furnace chamber varies cyclically. The effect of the intermittent fuel feed on the combustion process may be minimised by choosing a short stroke and a high frequency of reciprocation for the feeding device so that the fuel requirements are met by supplying relatively small quantities of fuel in quick succession rather than larger quantities of fuel at longer intervals of time. However, shortening of the stroke unduly is liable to introduce difficulties. Thus, for example, the feeding device is then liable to compact some coals so that feeding or proper feeding of the coal is not achieved. A further difficulty is found to arise with coal having a high moisture content or containing a substantial proportion of fines of a clayey nature on account of bridging of the fuel above the short travel path of the feeding device and consequent failure of the device to feed the coal. Another consideration is that with an intermittent fuel feed involving substantial idle periods during which no coal is being fed the rate of feed during the active periods in order to achieve the required average rate of supply of coal is correspondingly large. Such high rate of supply when the coal particles, because of their wetness or for other reasons, tend to adhere to one another favours cascading of coal as it leaves the cooperating member or spill plate so that the spreading efficiency of the spreading means is adversely affected. Because of the difficulties arising with reciprocatory feeding devices attempts have been made to apply vibrating feeders to spreader stokers but with little success.

In a feeder for solid material in a state of division having a reciprocatory feeding device arranged by moving in relation to a co-operating member to effect movement relatively to that member of material supported on the member, according to the present invention a reciprocating power device adapted to be operated by a source of fluid under pressure is arranged to drive the feeding device in a material feeding direction and in the reverse direction at different rates, the speed in the reverse direction being relatively great.

The invention will now be described, by way of example, with reference to the accompanying largely diagrammatic drawings, in which:

Figure 1 is a sectional side elevation through a reciprocatory fuel feeder and a spreader stoker with which it is associated, taken on the line I—I of Figure 3 and as viewed in the direction indicated by the arrows;

Figure 2 is a sectional front view taken on the line II—II of Figure 1 and as viewed in the direction indicated by the arrows;

Figures 5 to 8 are diagrams showing part only of the pneumatic system of Figure 4, the different diagrams showing different operative positions of the power device.

Figure 3:
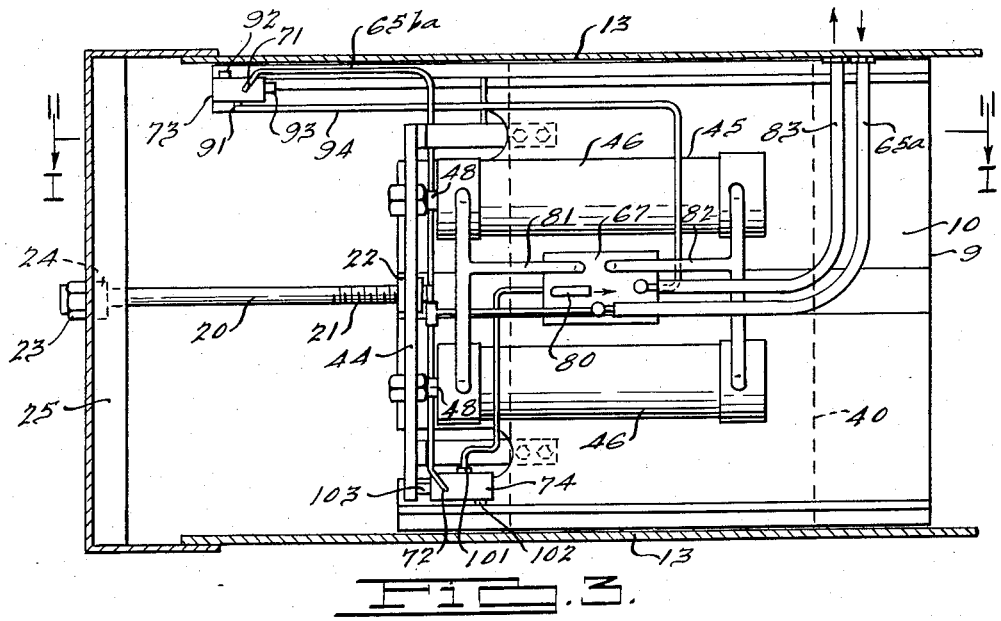
Figure 3 is an underneath view of the feeder shown in Figures 1 and 2, taken on the line III—III of Figure 2 but with supporting means for the feeder and parts of the spreader stoker omitted.

Referring first to Figure 1, a spreader stoker 1 of conventional design is arranged to discharge granular fuel through an opening 2 in the front wall 3 of a furnace chamber 4. The stoker includes a rotor 5 provided about its periphery with four spaced radial blades 6 operating within a part-cylindrical housing 7 which is open over an uper arc 8 of its circumference. Fuel is supplied to the stoker over the forward edge 9 of a horizontal spill plate 10 disposed immediately above the rotor 5, the spill plate resting upon angle irons 12 (see Figure 2) secured to vertical side walls 13 of the feeder housing 14 and being slidable along the angle irons 12 to permit variation of the disposition of the forward edge 9 relative to the rotor 5. This sliding movement is effected from outside the housing 14 by rotation of a spindle 20 screw-threaded at its rearward end 21 to engage a screw-threaded boss 22 provided on the spill plate and provided at its forward end with a hexagonal head 23 and a fixed collar 24 respectively disposed on opposite sides of a structural channel iron 25, which forms part of the housing, so that the spindle 20 is rotatable but cannot move axially.

Above the spill plate 10 is disposed a fuel chute 27, the rear wall 28 of which terminates some distance above the spill plate 10 and is provided with a vertically movable fuel control gate 29 operated by a rotatable pinion 30 which engages a rack 31 secured to the gate. The front wall 33 of the chute 27 also terminates some distance above the spill plate 10, and has associated with it a forwardly displaced and vertically adjustable extension piece 34. The side walls 35 are displaced inwardly from the side walls 13 of the housing 14 and carry on their inner surfaces support strips 36 upon which can be slid a plate 37 (see Figure 2 only) when it is desired to block the flow of fuel through the chute 27.

Slidably positioned on the spill plate 10 is a reciprocatory feeding device in the form of a pusher 40 positioned against sideways movement on the spill plate 10 by the side walls 13 of the fuel housing 14 and held against vertical movement by keys 42 secured to the side walls 13 and fitting within grooves 43 formed in the sides of the pusher. The pusher 40 and the co-operating member formed by the spill plate 10 together form a fuel feeder for the spreader stoker 1. A yoke 44 bolted to and extending across the front end of the pusher 40 serves to couple the pusher to a reciprocating power device 45 the parts of which are secured to the underside of the spill plate 10.

The reciprocating power device 45 includes two pneumatic cylinders 46 arranged with their axes parallel to the side walls 13 of the housing 14 and each containing a piston 47 mounted on a piston rod 48 which is secured at its forward end to the yoke 44. As may be seen from Figure 4, each cylinder 46 is provided at its ends with a central forward end part 49a and a central rearward end part 49b of smaller diameter into which can fit respectively parts 50a, 50b of the piston 47 which are of reduced diameter. Each cylinder end part 49a and 49b is also connected to the main part of the associated cylinder by a flow restricting needle valve 51 and by a non-return valve 52, which permits flow of air only from the end part 49a or 49b to the main part. These items 51 and 52 are provided actually in the end parts of the cylinder bodies.

The reciprocating power device 45 is part of a pneumatic system (see Figure 4) in which a source of high pressure air 60 is connected by a pipe 61 to an air filter 62 and thence by a pipe 63 to an oil mist device 64 the function of which is to entrain a mist of fine oil particles in the air. From the device 64 extends an air main 65 having two branches of which a first, 65a, leads to inlet port 66 of an air pressure operated, two position, five way, reversal control valve 67, and of which the second, 65b, branches again, the two branches 65ba and 65bb being connected to the inlet ports 71, 72 respectively of two signal valves 73 and 74.

The control valve 67 includes an axially displaceable piston 76 arranged to be subjected at its ends to two air pressures so that the piston assumes one of two axial positions depending upon which of the two pressures is the larger. The piston is provided with passages such that, when the piston is at a first axial position, the inlet port 66 is connected to a first transfer port 77 while a second transfer port 78 is connected to an exhaust port 79. The passages in the piston are such that, when the piston is in its second limiting position the inlet port 66 is connected to the second transfer port 78 and the first transfer port 77 is connected to an escape port 80. Pipes 81 and 82 connect the transfer ports 77 and 78 respectively to the cylinder end parts 49a, 49b and the exhaust port 79 is connected by a pipe 83 to a pressure reducing valve 84. The valve 84 is of the diaphragm operated type to which a control pressure is supplied through a pipe 85 and acts upon the diaphragm to determine the extent of the pressure reduction effected by the valve. This control pressure is derived from an indication of the steam pressure of a steam generator associated with the furnace chamber 4. The low pressure side of valve 84 is connected by a pipe 86 to a pressure gauge 87 and a fixed orifice device 88. The device 88 includes an orifice plate which is ¼ inch thick formed with an orifice which is of 0.040 inch diameter which thus provides an orifice of fixed characteristics. The low pressure side of the device 88 is provided with a vent 89.

The two pressures which determine the axial position of the piston 76 are derived from the two signal valves 73 and 74. Thus signal valve 73 is provided with a plunger slidable from a first axial position, in which the inlet port 71 is connected through passages in the plunger to a signal port 91, to a second and normal axial position, in which the signal port 91 is connected to an exhaust port 92, the arrangement being such that the plunger is at all times biassed by the pressures existing within the body of the signal valve towards the normal position in which an actuating pin 93 attached to the plunger extends fully from the body of the signal valve. The signal port 91 is connected by a pipe 94 to one end 95 of the control valve 67 so that the side of the piston 76 adjacent the end 95 is subjected either to the pressure in the air main 65 or to the ambient air pressure depending upon the axial position of the plunger of the signal valve 73.

The signal valve 74 is similar to the signal valve 73, being provided with a plunger, a signal port 101, an exhaust port 102, an actuating pin 103, and a connecting pipe 104 which connects the signal port 101 to the second end 105 of the control valve 67 so that the side of the piston 76 adjacent the end 105 is subjected either to the pressure in the air main 65 or to the ambient air pressure depending upon the axial position of the plunger 100 in the signal valve 74.

The signal valves 73 and 74 are so arranged on opposite sides of the yoke 44 with the actuating pins 93 and 103 directed inwardly towards the yoke that as the pusher 40, and with it the yoke 44, reaches a predetermined forward limiting position a projection 110 on the yoke 44 engages the actuating pin 93 of the signal valve 73 to move the plunger to that axial position in which the inlet port 71 is connected to the signal port 91, while as the yoke 44 reaches a predetermined rearward limiting position it engages the actuating pin 103 to move the plunger of the signal valve 74 to that axial position in which the inlet port 72 is connected to the signal port 101.

During operation of the spreader stoker 1 the fuel chute 27 is maintained filled with fuel and the rotor 5 is caused to rotate, in a clockwise direction as viewed in Figure 1.

Compressed air is supplied from the source 60 (see Figure 4) and passes through the air main 65 and thence through the branches 65b, 65ba and 65bb to the inlet ports 71, 72 of the two signal valves 73, 74 respectively. If the yoke 44 is initially in the position shown in Figure 4, the plungers of both the signal valves will be in their normal positions so that the signal ports 91, 101 are respectively in communication with the exhaust ports 92, 102 and atmospheric pressure is applied through each signal valve to the ends 95, 105 of the control valve 67.

The axially displaceable piston 76 of the control valve 67 will therefore remain in whichever axial position it happens to occupy. If it lies in the position indicated in Figure 4 then compressed air from the air main 65, 65a will flow through the inlet port 66 to the transfer port 77 and thence through the pipe 81 to the forward end part 49a of each cylinder 46 to urge the pistons 47 in a rearward direction. Air swept from the ends 49b of the two cylinders 46 passes through the pipe 82 to the second transfer port 78 and thence through the valve 67, the exhaust port 79, the pipe 83, the pressure reducing valve 84, the pipe 86 and the orifice device 88 to the vent 89. This rearward movement of the pistons 47 effects rearward movement of the piston rods 48, the yoke 44, and the pusher 40 (that is to say to the right as seen in Figure 1). The resistance to this rearward movement of the pusher 40 due to the fuel on the spill plate will, in the apparatus illustrated, normally be of the order of 50 pounds, the pressure of the air in the air main 65 will normally be between 80 and 100 pounds per square inch, and each of the pistons 47 is of 3 inches diameter. If the pipe 82 were vented directly to atmosphere, the force exerted on the pusher 40 by the two pistons would then be some 1,400 pounds, and a very rapid movement of the pusher take place. However, since the escape of the air from the pipe 83 is restricted considerably by the pressure reducing valve 84 and the orifice device 88, a considerable back pressure is built up in the pipe 82 so that the difference in pressure between the sides of the pistons 47 remains of the order of three and a half pounds per square inch, which is sufficient to apply a force of some 50 pounds to the pusher 40. If, due to compacting of the fuel or the presence of lumps in the fuel, the resistance to movement of the pusher 40 rises above the force of 50 pounds supplied by the three and a half pounds pressure difference, the movement of the pistons 47 is momentarily arrested, so that as air continues to escape through the vent 89 the pressure difference between the two sides of the pistons 47 rises rapidly to increase the force acting on the pusher to a value sufficient to overcome the resistance offered by the fuel.

The imposition of a small obstruction to movement of the pusher 40 causes only an imperceptible delay in its movement. A heavy obstruction might require several seconds to elapse before a force approaching the maximum force of 1,400 pounds is built up. It will be appreciated that this delay period will be greater near the beginning of the stroke than towards the end of the stroke.

Figure 4:
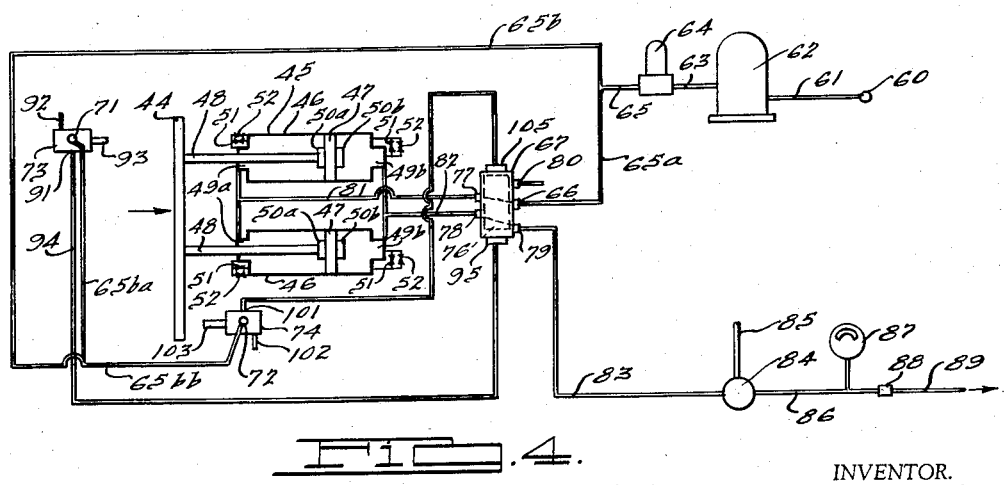
Figure 4 is a diagram of a pneumatic system including a reciprocating power device which is part of the reciprocatory feeder.

In the apparatus described, the stroke of the pusher 40 is nine inches and the reducing valve 84 is so set that against a resistance of 50 pounds the pistons 47 (and thus the pusher 40) completes the rearward feeding stroke of Figure 4 in about 12 seconds, while by adjustment of the control pressure applied to the pressure reducing valve through the pipe 85 the time needed for the stroke can be increased.

During the stroke of the pusher 40 fuel is fed along the spill plate 10 under the gate 29 to fall in a substantially steady stream over the front edge 9 of the spill plate 10 onto the rotor 5 of the spreader stroke, by which the fuel is flung into the furnace chamber 4.

The manner in which the reciprocating power device 45 effects a cyclic rearward and forward movement of the pusher 40 will be clear from Figures 5 to 8, which relate to the steady cyclic operation of the pneumatic system.

Figure 5 illustrates the conditions in the pneumatic system of Figure 4 during the main part of the rearward, fuel feeding stroke which has been described above with reference to Figure 4. During cyclic operation, at the beginning of this stroke air under pressure will have been admitted through the pipe 94 from the signal valve 73 to the end 95 of the control valve 67 so that the piston 76 will have been moved positively to the position shown in which compressed air is admitted to the ends 49a of the cylinders 46 through the pipe 81 and air swept from the cylinder ends 49b through the pipe 82 and the control valve 76 to the pipe 83 and so discharged in a controlled manner through the vent 89 (not shown in Figure 5).

Near the end of the rearward stroke of the pistons each piston end part 50b will enter a cylinder end part 49b as shown in Figure 6. Since air can only escape from the large part of each cylinder into the end part 49b through the needle valve 51, the movement of each piston is slowed down considerably. At about the same time the yoke 44 will engage the actuating pin 103 of the rearward signal valve 74 and move the plunger thereof to place the inlet port 72 in communication with the signal port 101 so that compressed air will flow through the pipe 104 to the end part 105 of the control valve 67 and cause the piston 76 to move axially into its other operative position, air being allowed to escape from the other side of the piston 76 through the pipe 94, the forward signal valve 73 and its exhaust port 92 to the atmosphere. The axial movement of the piston 76 places the inlet port 66 in communication with the transfer port 78 and the transfer port 77 in communication with the escape port 80. Compressed air flows through the pipe 82 into the cylinder end parts 49b and, by opening of the non-return valves 52 is able to act upon the whole surface area of each of the pistons 47. At the same time air is able to flow freely from the other end parts 49a of the two cylinders through the pipe 81, the control valve 67 and the escape port 80 to the atmosphere. Thus a very large force is set up upon the assembly of pistons, piston rods, yoke 44 and pusher 40, which all move rapidly forwards to the other limit of their travel.

Figure 7:
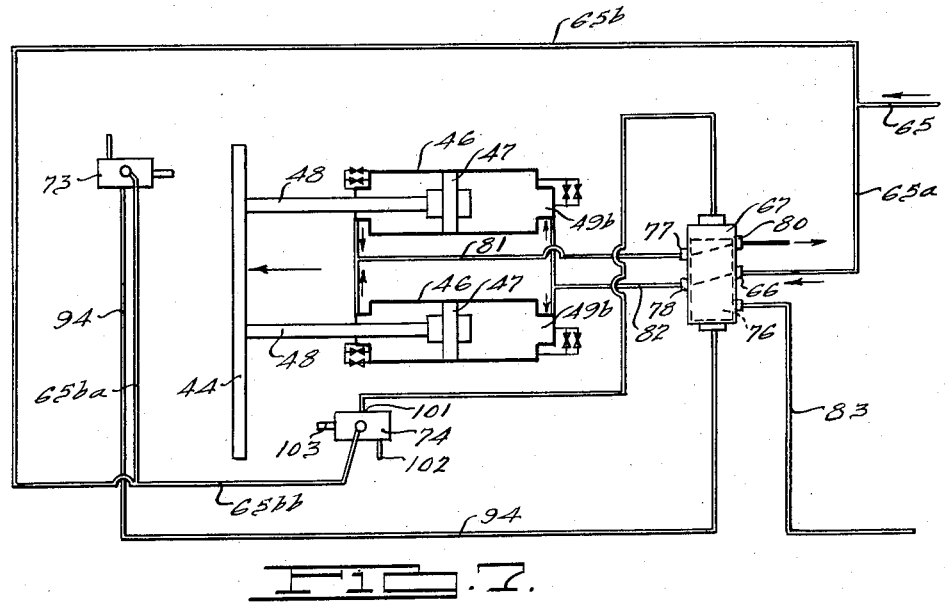

Figure 7 illustrates the conditions in the system as this rapid forward movement takes place. The actuating pin 103 of the rearward signal valve 74 is released by the yoke 44 and assumes a position in which the associated plunger places the signal port 101 in communication with the exhaust port 102, but in the absence of appreciable unbalanced forces upon it the piston 76 of the control valve 67 remains in its previous position. Air escapes from the forward ends of the two cylinders 46 very rapidly through the pipe 81, the inlet 67 and the escape port 80 and after about ⅓ of a second the piston parts 50a enter the cylinder end parts 49a (see Figure 8). Air trapped in the part of each cylinder of larger diameter can only escape relatively slowly through the needle valves 51, and this air acts as a cushion to check the rapid forward movement of the pistons 47. The degree of cushioning may be varied by adjustment of the needle valves.

Figure 8:
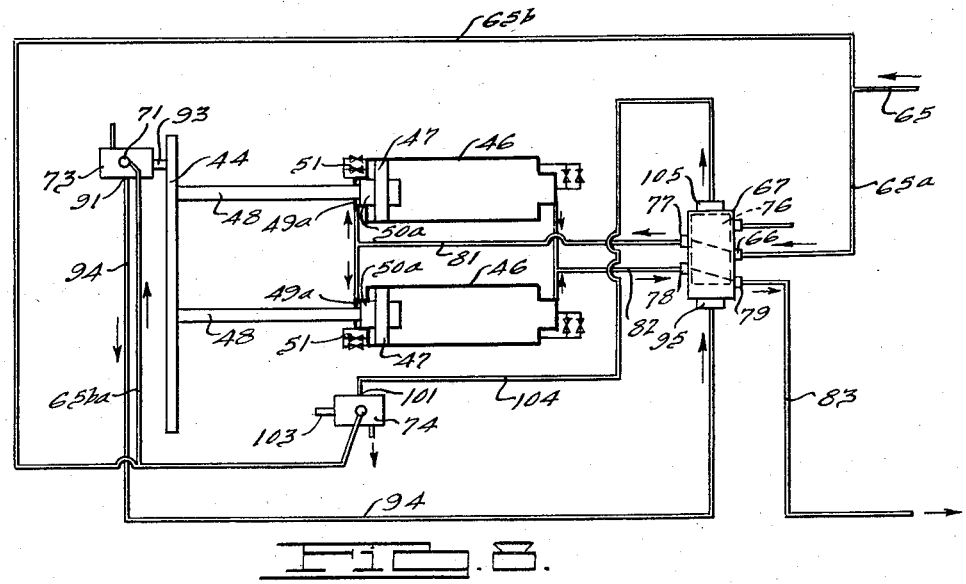

As the moving parts reach the forward limiting position the conditions in the system are as shown in Figure 8. The projection 110 on the yoke 44 engages and moves the actuating pin 93 of the forward signal valve 73 and places the inlet port 71 in communication with the signal port 91, so permitting compressed air to flow through the pipe 94 into the end 95 of the control valve 67. This compressed air causes the piston 76 to move axially to its other limiting position in which it places the transfer port 78 in communication with the exhaust port 79 and the transfer port 77 in communication with the inlet port 66. Thereupon compressed air flows from the air main 65a through the control valve 67 to the pipe 81 and thence into the forward end parts 49a of the cylinders 46.

The forward movement of the pistons 47 having been completed in a very short time, of the order of ⅓ of a second, the pressure in the rearward ends 49b of the cylinders 46 does not build up to the full supply pressure existing in the air main 65a before the piston 76 of control valve 67 has moved to cut off the flow of air from the inlet port 66 to the transfer port 78. As a result, the pistons 47 and therefore the yoke 44 and the pusher 40 move rapidly a short distance of the order of one inch in the rearward direction before the back pressure built up in the rearward end cylinder parts 49b reaches a value of the order of three and a half pounds per square inch less than that existing in the cylinder end parts 49a. This rapid initial rearwards movement of the pusher 40 is advantageous in that it rapidly compacts the fuel which has fallen in front of the pusher 40 during its forward movement and enables the pusher almost immediately to recommence the feeding of fuel over the edge 9 of the spill plate 10.

It has been found that with the arrangement shown it is not possible to observe by eye any hesitation in the coal feed over the edge 9 of the spill plate 10 despite the use of a reciprocatory feeding action.

The travel of the pusher 40 is approximately nine inches and the width of the spill plate 10 and pusher 40 is of the order of twenty inches, and it is found that with such a large travel "bridging" of the fuel over the space left by the pusher during its rapid forward travel does not occur even when the fuel is slack coal of a sizing from 1 inch downwards with a moisture content of about 15% and even when the fuel contains much fines of a clayey nature.

Since the rate of supply of fuel to the spreader stoker is substantially constant, the fuel/air ratio in the furnace chamber remains free from periodic fluctuations which characterised operations of other feeders associated with spreader stokers. Operation with a high $CO_2$ content of the flue gases is obtainable.

Variations in the rate of firing of the furnace chamber are effected by automatic or remote control of the control pressure applied through the pipe 85 to the pressure reducing valve 84, effect of which is to change the time taken for each rearward stroke of the pusher 40 and thus by varying the number of strokes per minute of the pusher to vary the tonnage of fuel discharged over the edge 9 of the spill plate 10 per hour. It has been found that steadier operation at low loads is best achieved by use of a smaller orifice device 88 rather than by excessive use of the pressure reducing valve 84. Thus in the apparatus described above a 0.040 inch diameter orifice was found to be suitable for boiler loads between 10,000 and 40,000 pounds of steam generated per hour, but where loads under 10,000 pounds of steam per hour were to be maintained, the coal feed tended to become erratic but could be kept steady if a smaller orifice were fitted.

To this end the orifice plate of the orifice device 88 is made readily replaceable.

It will be appreciated that, in operation, during the feeding stroke of the feeding device, the rate of movement is governed by the differential pressure acting in the reciprocating power device and, the air supply pressure being constant, this is determined by the pressure on the exhaust side of the power device, a condition governed by the joint action of the orifice device 88 and the pressure reducing valve 89.

The maximum rate of pusher movement to effect feeding of the fuel is determined by the size of orifice and is obtained when the reducing valve is fully open. As the pressure reducing valve is operated to reduce the air pressure applied to the orifice the rate of the feeding movement and therefore the rate of fuel feed is correspondingly reduced. A substantially straight line relationship is obtained between the pressure at the orifice and the feeder speed in strokes per minute. When the rate of fuel feed is to be regulated manually this may be effected by adjustment of the pressure reducing valve by hand as by varying a spring biassing pressure acting on a diaphragm.

During automatic operation, means responsive to the vapour pressure in the boiler associated with the furnace chamber, acting through pneumatic or other suitable relays, control a control pressure applied to the diaphragm of the pressure reducing valve and thereby adjust the setting of that valve and effect regulation of the vapour pressure.

The spill plate 10 may be readily removed from the feeder housing 14 complete with the pusher 40 and the reciprocating power device 45 so that in the event of a failure of the feeding device it may be readily uncoupled from the remainder of the pneumatic system and withdrawn, to be replaced with a serviceable assembly. This operation can be effected in a matter of minutes and, when several stokers feed a single furnace chamber, may be carried out without closing down the associated boiler or taking it off load.

In the apparatus described above, a pneumatic system was used to operate the reciprocating power device 45, and it was found that the use of an elastic pressure fluid such as air gave desirable working characteristics to the apparatus. If desired, the reciprocating power device 45 may be modified to operate with a liquid (i. e. non-elastic) working pressure fluid, the pneumatic system of Figure 4 being replaced with an hydraulic system giving similar control charactertistics for the operation of the feeding device.

It will be noted that in the arrangement of reciprocating power device 45 described the end of each of the cylinders 46 from which air is swept during the feeding stroke of the feeder is at the side of the piston 47 remote from the associated piston rod 48 and therefore from the piston rod gland which must be provided. This is of importance in view of the relatively slow rate at which air is passed by the vent 89 and thus the importance of any leakage from the said part of the cylinder.

I claim:

1. A feeder for solid material in a state of division comprising a reciprocatory pusher member for pushing said material intermittently in a feeding direction along a predetermined path, a reciprocating fluid motor arranged to drive the pusher member in the material feeding direction at a relatively slow speed and in the reverse direction at a relatively high speed, and means for controlling the speed of the feeding stroke by throttling the flow of fluid from the exhaust side of the fluid motor, said means including a restrictor of fixed characteristics in series with a variable restrictor.

2. A feeder for solid material in a state of division comprising a reciprocatory pusher member for pushing said material intermittently in a feeding direction along a predetermined path, a reciprocating fluid motor arranged to drive the pusher member in the material feeding direction at a relatively slow speed and in the reverse direction at a relatively high speed, and means for controlling the speed of the feeding stroke by throttling the flow of fluid from the exhaust side of the fluid motor, said means including an adjustable pressure reducing valve and a fixed orifice in series flow with said valve on the low pressure side thereof.

3. A feeder for solid material in a state of division comprising a reciprocatory pusher member for pushing said material intermittently in a feeding direction along a predetermined path, a reciprocating fluid motor arranged to drive the pusher member in the material feeding direction at a relatively slow speed and in the reverse direction at a relatively high speed, and means for varying the speed of the feeding stroke of the fluid motor without reducing the speed of drive in the reverse direction, said means including a variable restrictor arranged to throttle the flow of fluid from the exhaust side of the fluid motor, said means also including means for controlling the variable restrictor responsively to variations in the condition of apparatus being fed by said feeder thereby to compensate for said variations by varying the rate of feed of said solid material to said apparatus.

4. A feeder for solid material in a state of division comprising a reciprocatory pusher member for pushing said material intermittently in a feeding direction along a predetermined path, a reciprocating fluid motor arranged to drive the pusher member in the material feeding direction at a relatively slow speed and in the reverse direction at a relatively high speed, and means for controlling the speed of the feeding stroke by throttling the flow of fluid from the exhaust side of the fluid motor, said fluid motor having a gland and a piston mounted on a rod which is slidably sealed through said gland, the exhaust side of the fluid motor during the feeding stroke being at the side of said piston remote from said gland.

5. A feeder for solid material in a state of division comprising a reciprocatory pusher member for pushing said material intermittently in a feeding direction along a predetermined path, a reciprocating fluid motor arranged to drive the pusher member in the material feeding direction at a relatively slow speed and in the reverse direction at a relatively high speed, a reversing valve arranged to control the direction of drive of the fluid motor, said reversing valve being a pressure fluid operated valve having a piston member arranged to move between two alternative positions, a pair of signal valves operatively connected to said reversing valve for driving said piston member, said signal valves being responsive to the travel of said pusher member.

6. A feeder for solid material in a state of division comprising a reciprocatory pusher member for pushing said material intermittently in a feeding direction along a predetermined path, a reciprocating fluid motor arranged to drive the pusher member in the material feeding direction at a relatively slow speed and in the reverse direction at a relatively high speed, a reversing valve arranged to control the direction of drive of the fluid motor, said reversing valve being a pressure fluid operated valve having a piston member arranged to move between two alternative positions, a pair of signal valves operatively connected to said reversing valve for driving said piston member, said signal valves being responsive to the travel of said pusher member, said fluid motor, said reversing valve, and said signal valves all being mounted on a single member which is readily removable from its working position.

7. A feeder for solid material in a state of division comprising a pusher member mounted for reciprocation between a forward position and a reverse position, a bi-directional fluid motor for reciprocating said member, and valve means for controlling said motor, said valve means including a reversing valve for connection between said motor and a source of fluid under pressure and arranged to control the direction of drive of said motor, an exhaust throttling valve arranged to throttle the flow of exhaust fluid from said motor when said motor is actuated in the forward direction, and means for controlling said throttling valve responsively to a predetermined variable signal.

8. A feeder for solid material in a state of division comprising a pusher member mounted for reciprocation between a forward position and a reverse position, a bidirectional fluid motor for reciprocating said member, and valve means for controlling said motor, said valve means including a reversing valve for connection between said motor and a source of fluid under pressure and arranged to control the direction of drive of said motor, a pair of signal valves arranged to control said reversing valve responsively to the travel of said pusher member, an exhaust throttling valve arranged to throttle the flow of exhaust fluid from said motor when it is actuated in the feeding direction, and means for controlling said throttling valve responsively to a predetermined variable signal.

9. A feeder for solid material in a state of division comprising a pusher member mounted for reciprocation between a forward position and a reverse position, a bidirectional fluid motor for reciprocating said member, and valve means for controlling said motor, said valve means including a reversing valve for connection between said motor and a source of fluid under pressure and arranged to control the direction of drive of said motor responsively to the travel of said pusher member, an exhaust throttling valve arranged to throttle the flow of exhaust fluid from said motor when it is actuated in the feeding direction, said exhaust throttling valve including a restrictor of fixed characteristics in series flow with and on the low pressure side of a variable restrictor.

10. A fuel feeder for feeding solid fuel in a state of division into a furnace for combustion therein comprising a pusher member mounted for reciprocation between a forward position and a reverse position, a bidirectional fluid motor for reciprocating said member, and valve means for controlling said motor, said valve means including a reversing valve for connection between said motor and a source of fluid under pressure and arranged to control the direction of drive of said motor responsively to the travel of said pusher member, an exhaust throttling valve arranged to throttle the flow of exhaust fluid from said motor when it is actuated in the feeding direction thereby to control the rate of feed of said fuel into said furnace, said exhaust throttling valve including a restrictor of fixed characteristics in series flow with and on the low pressure side of the variable restrictor, and means for connection to apparatus being heated by said furnace for varying said variable restrictor responsively to changes in said apparatus which are dependent on the rate of fuel feed thereby to compensate for such changes.

References Cited in the file of this patent

UNITED STATES PATENTS

| 1,591,671 | Flanders | July 6, 1926 |
| 2,004,533 | Maynard | June 11, 1935 |
| 2,264,467 | Wolverton | Dec. 2, 1941 |